Aug. 16, 1938.     L. E. KNERR     2,126,783
SEALING MEANS FOR SEGMENTAL GATES
Filed May 25, 1937      2 Sheets-Sheet 1
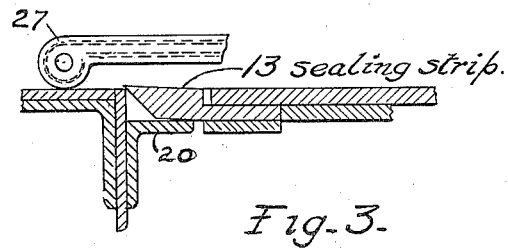
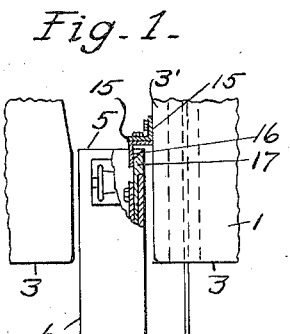
Fig.1.
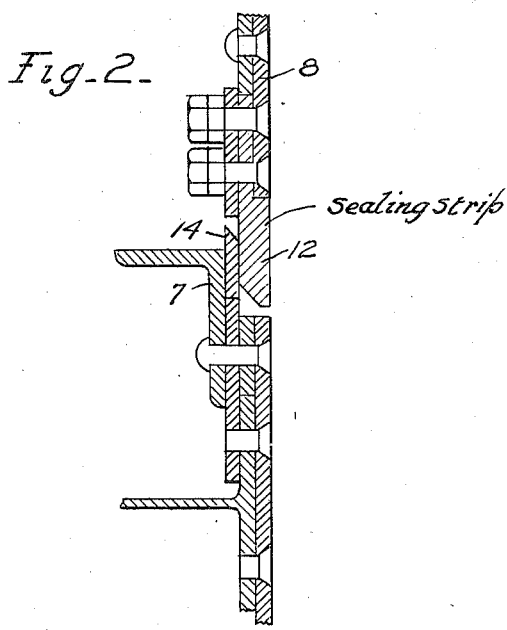
Inventor
Lewis E. Knerr
By Adam Richmond
Attorney

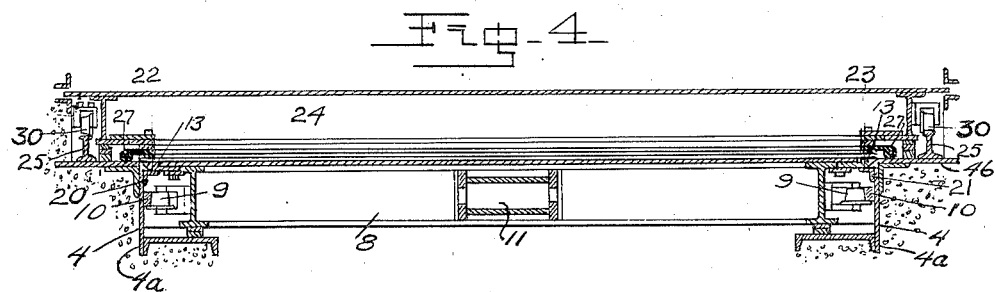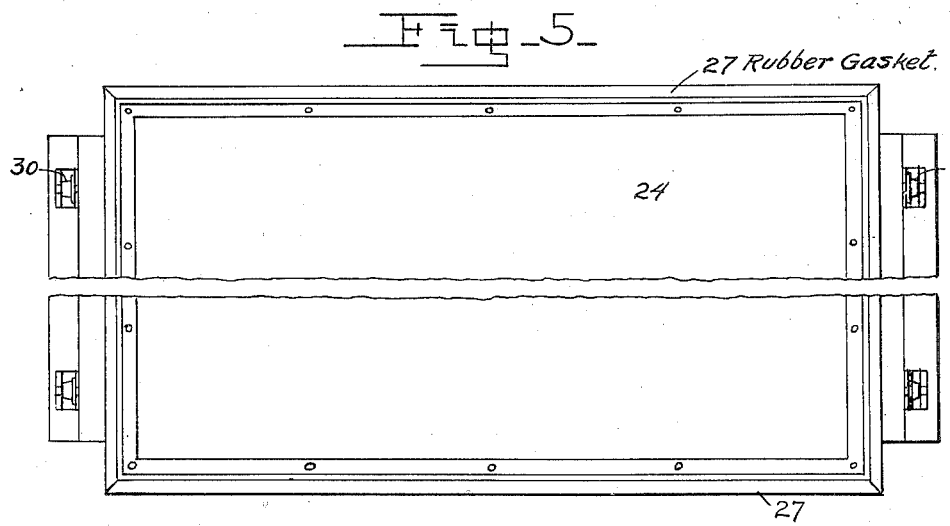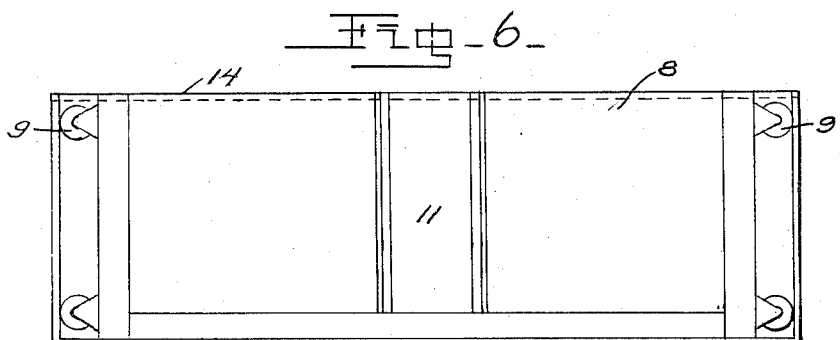

Patented Aug. 16, 1938

2,126,783

UNITED STATES PATENT OFFICE 2,126,783

SEALING MEANS FOR SEGMENTAL GATES

Lewis E. Knerr, Portland, Oreg., assignor to the Government of the United States of America, represented by the Secretary of War Application May 25, 1937, Serial No. 144,615

5 Claims. (Cl. 61—22)

(Granted under the act of March 3, 1883, as amended April 30, 1928; 370 O. G. 757)

This invention described herein may be manufactured and used by or for the Government for governmental purposes, without the payment to me of any royalty thereon.

This invention generically relates to segmental gates or barriers adapted to be located in the entrance and exit portals of fish locks of the type shown and described in the application of Harlan B. Holmes, Henry Blood and Milo C. Bell, filed June 2, 1937, Serial No. 146,016 and entitled a Method and apparatus for transferring migratory fish over a dam structure. More particularly, it is directed to a sealing construction in connection with the gate segments and the entrance and exit portals of a fish lock in which the barrier is adapted to be mounted.

In the application referred to, segmental barriers are slidably arranged in the entrance and exit portals of a fish lift, the segments composing the gate being relatively adjustable to form entrance and exit passages for the fish from the tailrace into the lock and from the latter into the forebay. These segments are further adjustable to vertically shift the fish passages in accordance with the change in elevation of the water in the tailrace and forebay of the dam construction. These passages are adapted to be closed by closure members which are slidably mounted over one face of the respective barrier. According to this construction, when the water level in the forebay or the tailrace changes in elevation, the passages formed by the adjustment of the segments may be vertically shifted in accordance with the change in water level and likewise the closure members may be vertically adjusted so as to close the passages in any of the adjusted positions. In a construction of this character it is essential that the longitudinal and lateral edges of the segmental barrier be effectively sealed when the lock has been filled with water.

It is therefore the aim and purpose of this invention to provide a sealing means in connection with the segments of a segmental barrier and the lock portal in which the barrier is disposed so that when the passage in the barrier has been closed and the lock filled with water, its portal will be effectively sealed against water seepage.

Another object of this invention is to provide a sealing arrangement in connection with the respective segments and between the barrier as a unit and the lock portal, whereby the water cannot escape from the lock through the joints between segments or around the top, bottom and sides of the barrier.

With these and other objects in view, this invention consists in certain novel details of construction, combination and arrangement of parts, to be more fully hereinafter described in claims.

Referring more particularly to the accompanying drawings in which corresponding parts are indicated by similar reference characters:

Fig. 1 is a fragmentary sectionized view, partly in elevation showing the entrance portal in a portion of the downstream wall of a fish lock, a segmental barrier positioned in the portal and the closure member for the opening, which is adapted to be formed by the relative adjustment of barrier segments.

Fig. 2 is an enlarged sectionized detail of the seal lock between the segments, shown broken away in Fig. 1.

Fig. 3 is an enlarged sectionized detail, illustrating the resilient sealing bead on the closure member and the sealing arrangement between the lateral edges of the barrier and those of the fish lock portal.

Fig. 4 is a transverse vertical section taken on a line 4—4, of Fig. 1.

Fig. 5 is a plan view of that face of the closure member which travels over one surface of the barrier.

Fig. 6 is a plan view of one of the segments composing the segmental barrier, illustrating the sealing member.

Figs. 7, 8, 9 and 10 are sectionized diagrammatic views illustrating respectively the arrangement of the segments to position the opening at various elevations and showing the closure member closing said opening at the different levels.

In the illustrative embodiment characterizing this invention, there is shown a portion of the downstream wall 1, of a fish lock (not shown), and a sill 2. The lower end of wall 1, as at 3, in conjunction with sill 2 defines the vertical limits of the fish lock entrance portal, the lateral limits of which are defined by the wing plates (4a) of the vertically disposed latterly spaced corner plates 4. A segmental barrier 5 composed of top and bottom segments 6 and 7, and intermediate segments 8 is slidably mounted between the wing plates (4a), the rollers 9 of the respective segments operating over guide rails 10, suitably attached to said wing plates (4a), as clearly shown in Fig. 4 of the drawings. Each of the segments 8 is formed with a central well 11 for the passage of a grappling device (not shown) which is adapted to be lowered through the well and connected to any selected segment, whereby the segments comprising the barrier may be relatively adjusted to provide the required fish passage and to vertically shift such passage. Affixed to each of the intermediate segments 8, adjacent its lateral and longitudinal edges are metal sealing strips 12 and 13. The upper longitudinal edge of each of the segments 7 and 8 carries a vertically disposed contact plate 14, adapted to frictionally engage the sealing strip 12 on the lower longitudinal edge of the superimposed segment, as clearly shown in Fig. 1 of the drawings.

The sealing construction for the top segment 6 differs somewhat from that of the intermediate and bottom segments 7 and 8 in that its upper longitudinal edge is formed with a sealing strip 17 instead of the vertically disposed contact plate 14, as in the case of the intermediate segments 8 and bottom segments 7.

Extending transversely across surface (3') of wall (1) and at a suitable distance above edge (3) of said wall is an angle iron (15) having one of its legs attached to and supporting a second angle iron (15'), whereby one leg of said second angle iron (15') is disposed so as to form a vertically extending bearing surface 16 above the entrance portal, as clearly shown in Fig. 1. This surface is adapted to frictionally engage the sealing strip 17 on the upper longitudinal edge of top segment 6, as clearly shown in Fig. 1 of the drawings. A similar angle iron 18 is positioned upon sill 2, with one leg disposed so as to provide a bearing surface 19, lying in the plane of the bearing surface 16. Angle irons 20 and 21 attached to side plates (4') are connected at their extremities with angle irons 15 and 18, one of the legs of each of the angle irons 20 and 21 being disposed so as to present bearing surfaces 22 and 23 lying in the plane of the bearing surfaces 18 and 19.

The series of angle irons 15, 18, 20 and 21, interconnected at their extremities as stated, will provide the inner surface of wall 1 contiguous the longitudinal and lateral edges of the entrance portal with a frame, the latter presenting in effect a continuous bearing surface adapted to engage the metal sealing strips of the various segments which form the segmental barrier 5. As the metal sealing strips extend to a slight extent into the planes of the surfaces which they are adapted to engage said strips upon engagement with said surfaces will be sprung slightly, thus affording a binding engagement between the sealing strips and their co-acting bearing surfaces.

Immediately adjacent the segmental barriers there is slidably mounted a closure member 24, provided at its extremities with rollers (30) adapted to travel guide rails 25, mounted on wing plates (4b) of corner plates (4), as clearly shown in Fig. 4 of the drawings. Closure member 24 is provided along its longitudinal and side edges with a suitable rubber beading 27 adapted to bear against the adjacent surface of the barrier, thus affording additional sealing protection against water seepage.

In conclusion it will be seen when the various segments of the segmental barriers have been relatively adjusted to form the entrance opening at various elevations as indicated at a, b, c and d of Figs. 7 to 10 inclusive, the instant invention will provide an effective water seal between the joints of the segments and likewise seal the top, bottom and sides of the barrier segments with respect to the entrance portal of the lock.

Having described my invention, what I claim as new and wish to secure by Letters Patent is:

1. In a sealing construction of the character described, the combination with segmental gates, including a series of segments superimposed along their longitudinal edges, of complementary sealing means extending from the abutting edges of the segments and co-acting to seal the joints between the segments, said means including a contact plate and a metal sealing strip, the metal sealing strip being inclined into the path of the contact plate to provide a binding engagement between the plate and the strip.

2. In a sealing construction of the character described, the combination with a wall having an opening, a bearing surface affixed to the wall and framing the opening, a segmental barrier slidably mounted in the opening, a sealing strip extending from the longitudinal and vertical edges of the barrier and adapted to frictionally engage the bearing surface to seal the longitudinal and vertical edges of the barrier with respect to those of said opening.

3. In a sealing construction of the character described, the combination with a wall having an opening, said wall including inner surface, a barrier slidably mounted in the opening, complementary sealing means to seal the barrier within said opening, said means including a contact element positioned on the inner surface of said wall and framing the opening and a metal strip projecting from the longitudinal and lateral edges of the segmental barrier and frictionally engaging the contact element.

4. In a sealing construction of the character described, the combination with a wall having an opening, said wall including an inner surface, a segmental barrier slidably mounted within the opening and including a plurality of segments arranged in superimposed relation along their longitudinal edges and means to seal the barrier within said opening, said means including contact elements secured to and offset from the inner surface of said wall and framing said opening, yieldable metal strips projecting from the longitudinal and lateral surfaces of the barrier and adapted to bindingly engage said contact elements, and means in conjunction with respective segments to seal the joint between said segments, said means including a sealing strip projecting from the longitudinal edge of one segment and a contact plate depending from the abutting edge of the superimposed segment.

5. In a sealing construction of the character described, the combination with a wall having an opening, said wall including an inner surface, a segmental barrier slidably mounted within the opening and including a plurality of segments arranged in superimposed relation along their longitudinal edges and means to seal the barrier within said opening, said means including contact elements secured to and offset from the inner surface of said wall and framing said opening, yieldable metal strips projecting from the longitudinal and lateral surfaces of the barrier and adapted to bindingly engage said contact elements, and means in conjunction with the respective segments to seal the joints between said segments.

LEWIS E. KNERR.